United States Patent [19]

Enomoto et al.

[11] Patent Number: 5,218,069
[45] Date of Patent: Jun. 8, 1993

[54] IMIDATED COPOLYMERS AND USES THEREOF

[75] Inventors: Norihide Enomoto; Kenji Yoshino; Yoshihiro Naruse; Seiji Yamamoto, all of Chiba, Japan

[73] Assignee: Kawasaki Steel Corporation, Tokyo, Japan

[21] Appl. No.: 788,874

[22] Filed: Nov. 7, 1991

Related U.S. Application Data

[63] Continuation of Ser. No. 510,007, Apr. 17, 1990, abandoned.

[30] Foreign Application Priority Data

Apr. 20, 1989 [JP] Japan .................. 1-101040
Apr. 20, 1989 [JP] Japan .................. 1-101041

[51] Int. Cl.$^5$ .................. C08F 226/06; C08F 222/08; C08F 212/08
[52] U.S. Cl. .................. 526/262; 526/271; 526/280; 526/347; 526/347.1
[58] Field of Search .................. 526/262

[56] References Cited

U.S. PATENT DOCUMENTS

| | | | |
|---|---|---|---|
| 4,408,010 | 10/1983 | Le-Khac | 525/73 |
| 4,518,754 | 5/1985 | Locatelli et al. | 526/262 |
| 4,683,275 | 7/1987 | Kato et al. | 526/262 |

OTHER PUBLICATIONS

L. F. Kim, L. L. Stotskaya, B. A. Krentsel, V. P. Zubov, V. B. Goluber and I. L. Stoyachenko, J. Macromol. Sci-Chem A12 (8), 1997-1210, 1978.
S. M. Mokhtar, M. G. Mikhael, R. O. Aly, and M. Z. Elsabee, Polymer Journal 20, 979-985, 1988.

*Primary Examiner*—Joseph L. Schofer
*Assistant Examiner*—Wu C. Cheng
*Attorney, Agent, or Firm*—Bierman and Muserlian

[57] ABSTRACT

The novel imidated copolymer of indene or the polymerizable component of naphtha oil and maleimide and, if necessary, maleic anhydride is useful as a resin improver and a compatibilizing agent for the purpose of improving heat resistance and mechanical properties.

Another novel imidated copolymer prepared by applying copolymerization of other polymerizable component to the polymerization process is useful as a resin improver and a compatibilizing agent in which, in addition to the above characteristic properties, melting temperature can be designed to a given level.

18 Claims, 1 Drawing Sheet

IMIDATED COPOLYMERS AND USES THEREOF

PRIOR APPLICATION

This application is a continuation of U.S. patent application Ser. No. 510,007 filed Apr. 17, 1990, now abandoned.

BACKGROUND OF THE INVENTION

1. Field of The Invention

This invention relates to imidated copolymers using indene or polymerizable components of inexpensive naphtha oil and the utilization thereof.

2. Description of Related Art

Many attempts have been made to improve the heat resistance of general-purpose plastics such as acrylonitrile-butadiene-styrene (ABS) resins, high-impact-polystyrene (HIPS) resins, polyvinyl chloride (PVC) resins and the like. In Plastics Vol. 135, No. 9 (1986), it is stated that in order to improve heat resistance of ABS resins and HIPS resins, a styrene-acrylonitrile copolymerization system is subjected to copolymerization wherein part of the styrene is replaced by α-methylstyrene and p-methylstyrene, so that the heat deformation temperature (HDT) is improved but the effect is not significant.

U.S. Pat. Nos. 4,761,455, 4,681,916, 4,677,164, 4,603,186 and 4,596,856 describe copolymerization of indene with acrylonitrile, α-methylstyrene, styrene, methyl methacrylate and the like. The resultant copolymers (resins) are improved in heat resistance by the addition of indene. When the copolymers are added to general-purpose plastics, the heat resistance of the blends or compositions is improved. However, the use of indene alone is not satisfactory with respect to the improving effect.

On the other hand, maleic anhydride and maleimide are polymerizable components capable of imparting heat resistance to resins. In Japanese Laid-open Patent Application Nos. 63-90557 and 63-128050 and U.S. Pat. No. 4,408,010, imidated products of styrene-maleic anhydride copolymer (SMA) are used to provide resin compositions by which the heat resistance of general-purpose plastics is improved.

The copolymer of styrene and maleic anhydride has attracted attention as a product capable of imparting heat resistance to general-purpose plastics such as ABS resins, HIPS resins, PVC resin, polystyrene resin and the like. Since the thermal decomposition of styrene-maleic anhydride copolymer (SMA) starts at 200° C., kneading, extrusion molding, injection molding and the like operations wherein general-purpose plastics are used in combination should generally be carried out at temperatures of not lower than 200° C., with an attendant disadvantage that the use of SMA in this field is only under specific conditions.

In order to overcome the disadvantage, partial imidation of SMA has been taken into account. According to U.S. Pat. No. 3,840,499, with copolymers of SMA imidated with ammonia, when an imidation rate increases by 1%, the glass transition temperature raises by about 3° C. In addition, with copolymers of SMA imidated with methylamine, when the imidation rate increases by 1%, the glass transition temperature increases by about 2° C. or more.

In the Polymer Papers (Japan) Vol. 139, p. 447 (1979), the thermal decomposition characteristics of styrene-N-phenylmaleimide copolymer are investigated wherein the starting temperature for thermal decomposition of the styrene-N-phenylmaleimide copolymer is reported as 320° C., which is higher by 120° C. or more than SMA. However, the imidated copolymer obtained only from styrene, maleic anhydride and the maleimide still presents a problem of poor compatibility when used as a heat-resistant resin improver for general-purpose plastics.

Those resins obtained from starting maleic anhydride and/or maleimide have acid anhydride groups and carbonyl groups therein. These functional groups are able to react with amido groups or amino group of polyamide (PA) resins. When utilizing this property, the resins have utility as a compatibilizing agent for PA resins such as nylon and polycarbonate (PC) resins or modified polyphenylene oxide (PPO) resins, which are difficult in fine dispersion only by mechanical means. For this purpose, Japanese Laid-open Patent Application No. 63-90557 and Journal of Japanese Rubber Association Vol. 61, No. 8, P.542 (1988) proposed a partially or wholly imidated product of styrene and maleic anhydride copolymer. The thermal decomposition starting temperature of these products is lower then 320° C. which is the thermal decomposition starting temperature of the styrene and N-phenylmaleimide copolymer which is a wholly imidated copolymer. Even though this imidated copolymer is intended for use as a compatibilizing agent for PA resins and PC resins or modified PPO resins, or as an improver for PA resins, the kneading and molding temperatures are limited to about 300° C., thus the known imidated copolymers presenting the problem for use as a resin improver.

As stated above, many techniques have been proposed for resins or resin compositions (hereinafter referred to as heat-resistant resin improver) capable of imparting heat resistance to general-purpose plastics such as ABS resins, HIPS resins, PVC resin and the like, but have some of the following problems.

(1) The effect as a heat-resistant resin improver is not satisfactory, with the problem with respect to the degrees in improvement of the heat deformation temperature (HDT) and glass transition temperature (Tg) of general-purpose plastics.

(2) When mechanical kneading and extrusion molding or injection molding is determined as being carried out at a temperature of from 200° to 250° C. for compounding and molding general-purpose plastics and heat-resistant resin improvers, there is the problem that the heat decomposition temperature of the known heat-resistant resin improver is in the vicinity of the above temperature range.

(3) When general-purpose plastics and heat-resistant resin improvers are mechanically compounded and molded at given temperatures, the compounding is difficult unless the melt viscosities of both types of resins are close to each other. The melt viscosity of the known heat-resistant resin improver differs form those of general-purpose plastics.

The present invention contemplates to solve the above problems (1) to (3).

Attention has been paid to polyamide resin-based alloyed resins such as polyamide-polycarbonate resin, polyamide-modified polyphenylene oxide resin and the like because of their good mechanical characteristics and chemical resistances.

However, the polyamide-polycarbonate and polyamide-modified polyphenylene oxide resins are not compatible and thus, a compatibilizing agent for finely dispersing the two resins is necessary. Known compatibilizing agents have the following problems.

(4) Known compatibilizing agents have not potential capability of finely dispersing polyamide-polycarbonate and polyamide-modified polyphenylene oxide resins, so the the resultant alloyed resins are unsatisfactory in mechanical characteristics.

(5) The temperature range in which polyamide-polycarbonate resin, polyamide-modified polyphenylene oxide resin or the like is mechanically kneaded and molded is generally in the vicinity of 300° C. In this temperature range, the compatibilizing agent becomes thermally unstable.

The wholly imidated copolymer obtained only from indene and a maleimide is described in Polymer Journal, Vol. 20, No. 11, pp. 979-985 (1988) and Japanese Patent Publication No. 49-26949. However, these publications deal only with a kinetic study and a preparation process using a irradiation polymerization technique and do not suggest the utility as a heat-resistant resin improver or a compatibilizing agent for polyamide resin-based alloys. In addition, the molecular weight of the imidated copolymer is not clarified.

U.S. Pat. No. 4,600,747 describes a flame-resistant ABS resin using a resin composition comprising indene and a maleimide, but the application to the flame-resistant ABS resin is completely different from that of the present invention. In this patent, optimum contents of indene and the maleimide are not stated and it is not known whether or not indene and the maleimide are essential in the composition. In addition, the use of indene and the maleimide is not particularly shown in any example.

The applicants of this invention have already described the copolymer including polymerizable components of naphtha oil as follows.

Naphtha from coal or petroleum has a boiling point of from 80° to 220° C. and is chiefly composed of aromatic hydrocarbons having from 8 to 11 carbon atoms. The naphtha oil contains a component (polymerizable component) having a reactive double bond and composed mainly of indene. Indene has a bicyclic structure which is more rigid than styrene. Accordingly, the resin comprised of a polymerizable indene component can be expected as improving heat resistance. The present inventors made studies on the preparation of copolymers of the polymerizable component in naphtha oil and maleic anhydride and found that copolymers of the polymerizable component in naphtha oil and maleic anhydride could be industrially produced at a higher yield than as reported in Macromol., Chem., 62, 120 (1963) and with different distributions of molecular weight being attained by combination of reaction conditions. The resultant copolymers including alkali hydrolyzates, ester products, alkali hydrolyzates of sulfonated product and non-modified products were found effective as various dispersants, coating compositions, adhesives, heat-resistant resin improvers for general-purpose plastics, compatibilizing agents for polyamide resins and the like and proposed in U.S. patent application No. 372,306 (corresponding to published European Patent Application No. 0348975).

When the copolymers are utilized as an improver for general-purpose plastics, limitation is placed on the compounding conditions with the general-purpose plastics. On the other hand, when they are used as a compatibilizing agent for polyamide resin, the resultant alloyed resins have still a problem on the improvement in mechanical characteristics.

SUMMARY OF THE INVENTION

The present inventors made intensive studies on the improvement of copolymers of a polymerizable component in naphtha oil wherein indene is a main polymerizable component and maleic anhydride for use as a heat-resistant resin improver for general-purpose plastics and also as a compatibilizing agent for polyamide-based alloy resins. As a result, it has been found that imidated products obtained by partially or wholly imidating acid anhydride groups of copolymers of a polymerizable component in naphtha oil wherein indene is a main polymerizable component and maleic anhydride are useful as a heat-resistant resin improver of a compatibilizing agent for polyamide resin. The invention is based on the above finding.

According to this invention, there is provided an imidated copolymer consisting essentially of indene or a polymerizable component in naphtha oil which is made of aromatic hydrocarbons having from 8 to 11 carbon atoms and is mainly composed of indene, a maleimide and, if necessary, maleic anhydride.

There is also provided an imidated copolymer consisting essentially of a polymer of the above-mentioned components as essential ingredients, and a component copolymerizable with the polymerizable component in naphtha oil and/or maleimide and/or maleic anhydride.

The maleimide is preferably at least one member selected from the group consisting of N-phenylmaleimide and cyclohexylmaleimide.

The copolymerizable component is preferably selected from the group consisting of compounds of the following (a), (b), (c) and (d):

(a) styrenes,
(b) cyanated vinyls,
(c) acrylic or methacrylic esters, and
(d) dienes.

According to this invention, there is provided a resin improver for general-purpose plastics including acrylonitrile-butadiene-styrene (ABS) resins, high impact polystyrene (HIPS) resins and polyvinyl chloride (PVC) resins which comprises the above-mentioned novel imidated copolymer.

There is also provided an improver for polyamide resins which comprises the imidated copolymer as a primary component, and a compatibilizing agent for polyamide-based resin alloys including polyamide (PA) - polycarbonate (PC) resins and polyamide (PA) -modified polyphenylene oxide (PPO) resins which comprises the imidated copolymer as a primary component.

DETAILED DESCRIPTION OF THE PREFERRED EMBODIMENTS

Figure 1:
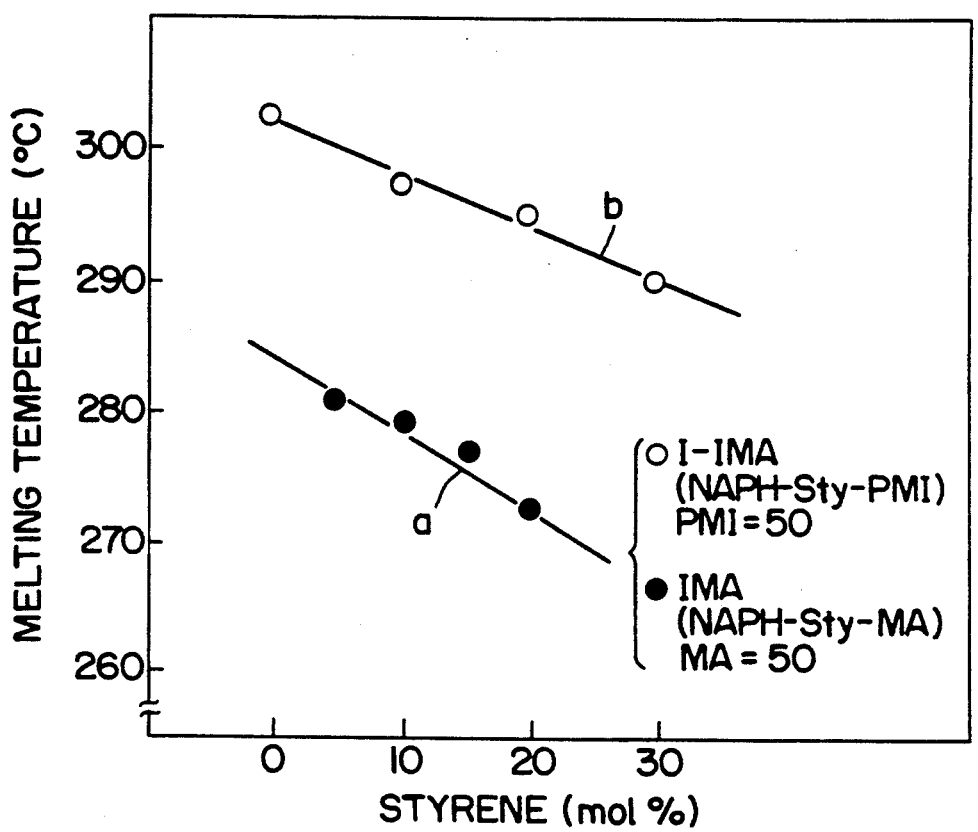
FIG. 1 is a graphical representation of the melting temperature in relation to the amount of styrene in copolymers obtained in Examples 19 to 22 and Comparative Examples 1 to 4.

Naphtha oil from coal or petroleum has a boiling point of from 80° to 220° C. and is chiefly composed of aromatic hydrocarbons having from 8 to 11 carbon atoms. The naphtha oil contains a polymerizable component mainly composed of indene.

For instance, the polymerizable component in naphtha oil is mainly comprised of indene and is contained in an amount of not less than 5 wt % in naphtha oil. The polymerizable component has the following ingredients (A), (B) and (C) which are totally 100 wt %.
(A) Indene 60–99 wt %
(B) Styrene 0.5–29.5 wt %
(C) one or more of α-methylstyrene, methylstyrene, methylindene, dimethylstyrene, trimethylstyrene, cumarone, and dicyclopentadiene 0.5–29.5 wt % in total.

Once again, the total of (A), (B) and (C) is substantially (A)+(B)+(C)=100.

The naphtha oil contains as non-polymerizable components xylene, ethylbenzene, propylbenzene, ethyltoluene, indane, trimethylbenzene, tetramethylbenzene, naphthalene and the like.

When indene alone is used as one of the starting materials, it can be obtained by precision distillation of naphtha oil but with poor economy. When naphtha oil having not less than 90 wt % of indene in polymerizable components is used, the resultant imidated copolymer has properties which are little difference from those of imidated copolymers prepared using indene instead of the naphtha oil.

In the process of the present invention, maleic anhydride is used generally in a solid state, but may also be used by dissolving it in a solvent such as an aromatic hydrocarbon, methylethyl ketone and methylisobutyl ketone.

When maleic anhydride is used as one of the starting materials, reactive acid anhydride groups are introduced into the resultant imidated copolymer, which will make esterification and graft polymerization more effective.

The preparation of the imidated copolymer may be effected by a procedure wherein maleic anhydride is used as a starting material and the acid anhydride groups introduced into the resin is modified with ammonia or a primary amine to obtain an imidated copolymer, or by a procedure wherein a maleimide is used as one of starting materials to obtain an imidated copolymer. Using a starting maleimide is favorable.

The maleimide used has the following structural formula

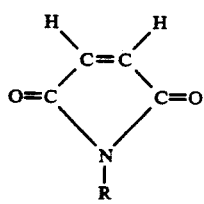

Wherein R represents an alkyl group such as methyl, ethyl, propyl, cyclohexyl or the like, an aryl group such as phenyl, tolyl or the like or hydrogen. Preferably, R represents cyclohexyl or phenyl. The imidated copolymer obtained from a maleimide of the formula wherein R is cyclohexyl or phenyl is better for use as a heat-resistant resin improver or compatibilizing agent.

In this invention, a copolymerizable component mentioned below may be added to the imidated copolymer of the polymerizable component in naphtha oil (or indene) and maleimide (and, if necessary, maleic anhydride).

(a) Styrenes such as styrene, α-methylstyrene, methylstyrene, chlorostyrene and the like.
(b) Cyanated vinyls such as acrylonitrile, methacrylonitrile and the like.
(c) Acrylic or methacrylic esters such as alkyl acrylates or alkyl methacrylates.
(d) Dienes such as isoprene, butadiene and the like.

The compound or compounds in one or more groups of the above (a), (b), (c) and (d) may be used.

By the addition of these polymerizable components, melting temperature of the resultant imidated copolymer can be reduced to an appropriate level, which renders possible set up of a given melting temperature suitable for a counterpart resin when the imidated copolymer is used as a resin improver or a compatibilizing agent. The counterpart resins may preferably include acrylonitrile-butadiene-styrene (ABS) resins, high-impact polystyrene (HIPS) resins, polyvinyl chloride (PVC) resins and polycarbonate (PC) resins.

The compositional ratio between the polymerizable component in naphtha oil (or indene) and the maleimide is such that the content of the maleimide is in the range of from 25 mol % to 75 mol % based on the total moles of the imidated copolymer. Preferably 40 to 60 mol %, more preferably, approximately 50 mol % is industrially convenient because the imidated copolymer can be prepared at high yield.

The compositional ratio among the polymerizable component in naphtha oil (or indene), the maleimide and the maleic anhydride is such that the sum of the contents of the maleimide and the maleic anhydride is in the range of from 25 mol % to 75 mol % based on the total moles of the imidated copolymer. And the mole ratio of maleic anhydride:the maleidide may be 1:99 to 99:5, because the imidated copolymer having improved heat resistance can be prepared.

With regard to the compositional ratios of the polymerizable component in naphtha oil (or indene), a maleimide and a copolymerizable component, an appreciable effect is recognized when the total of the polymerizable component of naphtha oil (or indene) and maleimide is not less than 10 mol % based on the total composition.

The imidated copolyer thus obtained has a molecular weight (number average molecular weight (Mn)) ranging from 2,000 to 100,000 by gel permeation chromatography (GPC) method based on polystyrene.

The imidated copolymer according to this invention may be wholly imidated copolymer or partially imidated copolymer.

The terms on resin characteristics used herein are defined below.

Melting temperature: a temperature at which the resin viscosity reaches 5000 poises and which is generally accepted as appropriate for mechanical kneading with general-purpose plastics.

Heat decomposition temperature: a temperature at which the resin weight starts to reduce when the resin is heated in an atmosphere of nigtrogen from room temperature at a rate of 3° C./minute and which is an index for heat stability of the resin.

Wholly imidated copolymer: The term is intended to mean an imidated copolymer wherein all the acid anhydride groups in the copolymer are converted into imido groups or an imidated copolymer which is free of any acid anhydride group in the copolymer because of the absence of meleic anhydride at the time of the preparation of the resin.

Partially imidated copolymer: The term means an imidated copolymer having an acid anhydride group therein.

(1) Wholly imidated copolymer

The wholly imidated copolymer has better heat stability. For instance, the copolymer of naphtha oil having not less than 90 wt % of indene or indene itself and N-phenylmaleimide has a heat decomposition temperature of 360° C. which is higher than 320° C. of the copolymer of styrene and N-phenylmaleimide and has thus good heat stability. However, the melting temperature is as high as 330° C., which makes it difficult in some case to mechanically knead it with other resins. In this case, in order to lower the melting temperature, and the copolymerizable component, which is already described (a) to (d), with the polymerizable component of naphtha oil or indene and/or maleimide should be added to prepare an imidated copolymer.

(2) Partially imidated copolymer

The partially imidated copolymer of the invention has the rigid, thermally stable indane ring group ascribed to the polymerizable component of naphtha oil (or indene) and the imido group, with good heat stability.

The acid anhydride group of the partially imidated copolymer reacts and grafts with the amine group at the ends of polyamide resin and the copolymer is thus useful as a compatibilizing agent for polyamide-based alloyed resin or as an improver for polyamide resins.

The ratio of the acid anhydride group to be introduced into the copolymer depends on the ratios of the polymerizable component of naphtha oil (or indene), maleimide and maleic anhydride. An appropriate ratio of the acid anhydride group is in the range of not less than 1 mol % based on the total mols of the polymerizable component of naphtha oil (or indene), maleimide and maleic anhydride, within which the merit of the acid anhydride is shown. The content of the acid anhydride may be controlled by treating the acid anhydride groups of the copolymer of the polymerizable component of naphtha oil (or indene) and maleic anhydride with a primary amine, instead of adding a maleimide, thereby providing a partially imidated copolymer.

The thus obtained partially imidated copolymer has the rigid, thermally stable indane ring, acid anhydride group and imido group and thus, has a high heat resistance. In particular, the contribution of the indane ring to the heat stability is great.

Although the partially imidated copolymer has a high heat resistance, the melting temperature becomes high. The high melting temperature presents no problem when treating 6-nylon which is a polyamide resin or a polycarbonate resin which has a high melting temperature and whose treating temperature is in the vicinity of 300° C. However, the treating temperature for kneading or molding of general-purpose plastics is generally in the vicinity of 250° C. In this case, for the purpose of reducing the melting temperature of the partially imidated copolymer, it is necessary to prepare a partially imidated copolymer by adding an additional component copolymerizable with the polymerizable component of naphtha oil (or indene), maleic anhydride or maleimide.

Examples of the component (a) to (d) copolymerizable with the polymerizable component of naphtha oil (or indene), maleic anhydride or maleimide are already mentioned above.

The imidated copolymer may be prepared by any of bulk polymerization, solution polymerization and aqueous suspension polymerization. If, however, maleic anhydride is contained in the copolymerization composition, the maleic anhydride undergoes hydrolysis with water and is migrated toward an aqueous phase, so that the preparation by suspension polymerization is not advantageous. The polymerization reaction proceeds in the presence of a radical initiator. The radical initiators to be used may be either peroxides or diazo compounds and should have an effective temperature range of from 30° to 180° C.

The whole amount of the radical initiator may be charged into a reactor along with the polymerization components but if the decomposition rate of the initiator is high, it is preferred that the initiator is charged gradually into the reactor.

The reaction may be performed in the presence or absence of solvent. The solvent to be used may include aromatic hydrocarbons, halogenated hydrocarbons such as dichloroethane and ketones such as methylethyl ketone and methylisobutyl ketone, with most preferable solvents being benzene, toluene and cumene.

When the wholly imidated copolymer or partially imidated copolymer thus prepared is used as a resin improver for general-purpose plastics such as acrylonitrile-butadiene-styrene (ABS) resins, polyvinyl chloride (PVC) resins and high impact polystylene (HIPS) resins, improvement of heat resistance, compatibility, mechanical strength by graft polymerization and the like of resins can be expected.

The imidated copolymer of the present invention can also improve heat resistance, compatibility, mechanical strength by graft polymerization and the like of resins, when the copolymer is used as an improver for polyamide resins.

In addition, alloyed resins having excellent mechanical properties can be obtained when the imidated copolymer of the present invention is used as a compatibilizing agent for polyamide alloyed resins such as polyamide-polycarbonate (PC) resins and polyamide-modified polyphenylene oxide (PPO) resins.

EXAMPLES

The present invention is more particularly described by way of examples but no way of limitation.

EXAMPLE 1

100 ml of benzene was charged into a four-necked flask having an inner capacity of 1 liter (equipped with an agitation blade, a cooling tube and a dropping funnel) and heated by means with an outside heater to a refluxing temperature. 58 g of naphtha oil (having 50 wt % of a polymerizable component which contains 90% of indene), 43.3 g of N-phenylmaleimide and 820 mg of azobisisobutylonitrile used as a polymerizing initiator were diluted with 300 ml of benzene and placed in the dropping funnel, followed by gradual dropping into the polymerization reactor. After completion of the dropping, the reaction was continued for 3 hours at a reaction temperature of 80° C. After completion of the reaction, the reaction solution was poured into a large amount of methanol to collect the resultant copolymer as white powder. Thereafter, the powder was dried under reduced pressure until a constant weight was attained at 150° C. The yield calculated from the weight after the drying was found to be 95 wt %. The number average molecular weight determined by GPC was 21,500. The heat decomposition temperature by a thermobalance was 358° C. The melting temperature determined by a flow tester was 327° C.

EXAMPLE 2

In the same manner as in Example 1 using toluene as the solvent for the reaction instead of benzene and the reaction temperature used was 110° C., there was obtained an imidated copolymer. The yield of the thus obtained copolymer was 96 wt %.

The number average molecular weight determined by GPC was 12,300. The heat decomposition temperature was 358° C. The melting temperature was 324° C.

EXAMPLE 3

In the same manner as in Example 1 using cumene as the solvent for the reaction instead of benzene and the reaction temperature used was 110° C. there was obtained an imidated copolymer. The yield of the thus obtained copolymer was 95 wt %.

The number average molecular weight determined by GPC was 6,400. The heat decomposition temperature was 358° C. The melting temperature was 315° C.

EXAMPLE 4

100 ml of benzene was charged into a four-necked flask having an inner capacity of 1 liter (equipped with an agitation blade, a cooing tube and a dropping funnel) and heated by means with an outside heater to a refluxing temperature. 58 g of naphtha oil (having 50 wt % of a polymerizable component which contains 90% of indene), 21.7 g of N-phenylmaleimide, 12.3 g of maleic anhydride and 820 mg of azobisisobutyronitrile used as an initiator ware diluted with 300 ml of benzene and placed in the dropping funnel, followed by gradual dropping into the polymerization reactor. After completion of the dropping, the reaction was continued for 3 hours at a reaction temperature of 80° C. After completion of the reaction, the reaction solution was poured into a large amount of methanol to collect the resultant copolymer as white powder. Thereafter, the powder was dried under reduced pressure until a constant weight was attained at 150° C. The yield calculated from the weight after the drying was found to be 95 wt %. The number average molecular weight determined by GPC was 19,500. The heat decomposition temperature was 328° C. The melting temperature determined by a flow tester was 295° C.

EXAMPLES 5 TO 11

In the same manner as in Example 4 using toluene as the solvent for the reaction, a reaction temperature of 110° C. and the feeds of the starting materials indicated in Table 1, there were obtained imidated copolymers. Indene was used instead of the polymerizable component of naphtha oil. The feeds of the starting materials, yield, melting temperature, and heat decomposition temperature are shown in Table 1.

TABLE 1

| Ex- | Feeds of Starting Materials (g) | | | Yield | Heat Decomposition Temperature (°C.) | Melting Temperature (°C.) |
| --- | --- | --- | --- | --- | --- | --- |
| ample | IN | MA | PMI | (wt %) | | |
| 5 | 29 (50) | | 43.6 (50) | 97 | 360 | 327 |
| 6 | 29 (50) | 2.45 (5) | 39.2 (45) | 97 | 348 | 310 |
| 7 | 29 (50) | 4.9 (10) | 34.8 (40) | 98 | 345 | 309 |
| 8 | 29 (50) | 12.3 (25) | 21.8 (25) | 95 | 330 | 307 |
| 9 | 29 (50) | 14.7 (30) | 17.4 (20) | 96 | 328 | 306 |
| 10 | 29 (50) | 19.6 (40) | 8.7 (10) | 94 | 325 | 304 |
| 11 | 29 (50) | 22.1 (45) | 4.4 (5) | 90 | 320 | 302 |

Note)
The values in parentheses at the column of the feeds of starting materials indicate ratios (mol %) of the respective polymerizable components based on the total of the components.
IN: indene
MA: maleic anhydride
PMI: N-phenylmaleimide When determined by elementary analysis, the resin compositions of the imidated copolymers obtained in Examples 5 to 11 were coincident with those of the charged compositions, respectively.

EXAMPLES 12 TO 18

In the same manner as in Example 5 wherein N-phenylmaleimide was replaced by cyclohexylmaleimide, there were obtained imidated copolymers. The feeds of the starting materials, and yield, melting temperature and heat decomposition temperature are shown in Table 2.

TABLE 2

| Ex- | Feeds of Starting Materials (g) | | | Yield | Heat Decomposition Temperature (°C.) | Melting Temperature (°C.) |
| --- | --- | --- | --- | --- | --- | --- |
| ample | IN | MA | PMI | (wt %) | | |
| 12 | 29 (50) | | 44.7 (50) | 97 | 350 | 300 |
| 13 | 29 (50) | 2.45 (5) | 40.3 (45) | 97 | 331 | 285 |
| 14 | 29 (50) | 4.9 (10) | 35.8 (40) | 98 | 330 | 284 |
| 15 | 29 (50) | 12.3 (25) | 22.4 (25) | 95 | 312 | 283 |
| 16 | 29 (50) | 14.7 (30) | 17.9 (20) | 96 | 306 | 275 |
| 17 | 29 (50) | 19.6 (40) | 9.0 (10) | 94 | 302 | 270 |
| 18 | 29 (50) | 22.1 (45) | 4.7 (5) | 90 | 299 | 267 |

Note)
The values in parentheses at the column of the feeds of starting materials indicate ratios (mol %) of the respective polymerizable components based on the total of the components.
IN: indene
MA: maleic anhydride
CMI: cyclohexylmaleimide

EXAMPLES 19 TO 22 AND COMPARATIVE EXAMPLES 1 TO 4

In the same manner as in Example 2 or 4, copolymers of polymerization compositions indicated in Table 3 were prepared in order to investigate a lowering tendency of the melting temperature by addition of styrene. It will be noted that the copolymers in which N-phenylmaleimide were not contained were settled during the reaction and the reaction solutions were not poured into methanol but the copolymers were separated from the solutions by filtration and dried.

TABLE 3

| Example | Feed Compositions (mol %) | | | | Yield (wt %) | Heat Decomposition Temperature (°C.) |
|---|---|---|---|---|---|---|
| | NAPH | STY | MA | PMI | | |
| 19 | 50 | 0 | 0 | 50 | 95 | 350 |
| 20 | 40 | 10 | 0 | 50 | 97 | 347 |
| 21 | 30 | 20 | 0 | 50 | 94 | 343 |
| 22 | 20 | 30 | 0 | 50 | 96 | 340 |
| Comparative Example | | | | | | |
| 1 | 45 | 5 | 50 | 0 | 97 | 310 |
| 2 | 40 | 10 | 50 | 0 | 95 | 308 |
| 3 | 35 | 15 | 50 | 0 | 96 | 304 |
| 4 | 30 | 20 | 50 | 0 | 98 | 300 |

Note)
NAPH: polymerizable component in naphtha oil (having an indene content of 80 wt %, a styrene content of 9 wt % and others content of 11 wt % in the polymerizable component)
STY: styrene
MA: maleic anhydride
PMI: N-phenylmaleimide The relation between the melting temperature and the amount of styrene in the copolymers of Examples 19 to 22 and Comparative Examples 1 to 4 is shown in FIG. 1. From FIG. 1, the melting temperature of the copolymer decreases with an increasing amount of styrene.

In FIG. 1, the line a shows the relation between the melting temperature and the amount of styrene in the copolymers of polymerizable components in naphtha oil (NAPH), styrene (STY) and maleic anhydride (MA) in Comparative Examples 1 to 4. In FIG. 1, the line b shows the relation between the melting temperature and the amount of styrene in the copolymers of polymerizable components in naphtha oil (NAPH), styrene (STY) and N-phenylmaleimide (PMI) in Examples 19 to 22.

Therefore the line a shows the relation of the copolymers which has an imidated ratio of 0%, the line b shows the relation of the copolymers which has an imidated ration of 100%.

It will be noted that the melting temperature of a partially imidated copolymer of each composition is at a level between the upper line b and the lower line a.

EXAMPLES 23 TO 34

In the same manner as in Example 2 except that the total of the polymerizable components was 1 mole and different charging compositions indicated in Table 4 were used, there were obtained imidated copolymers. The polymerization compositions, yield and melting temperature for some copolymers are shown in Table 4.

Figure 2:
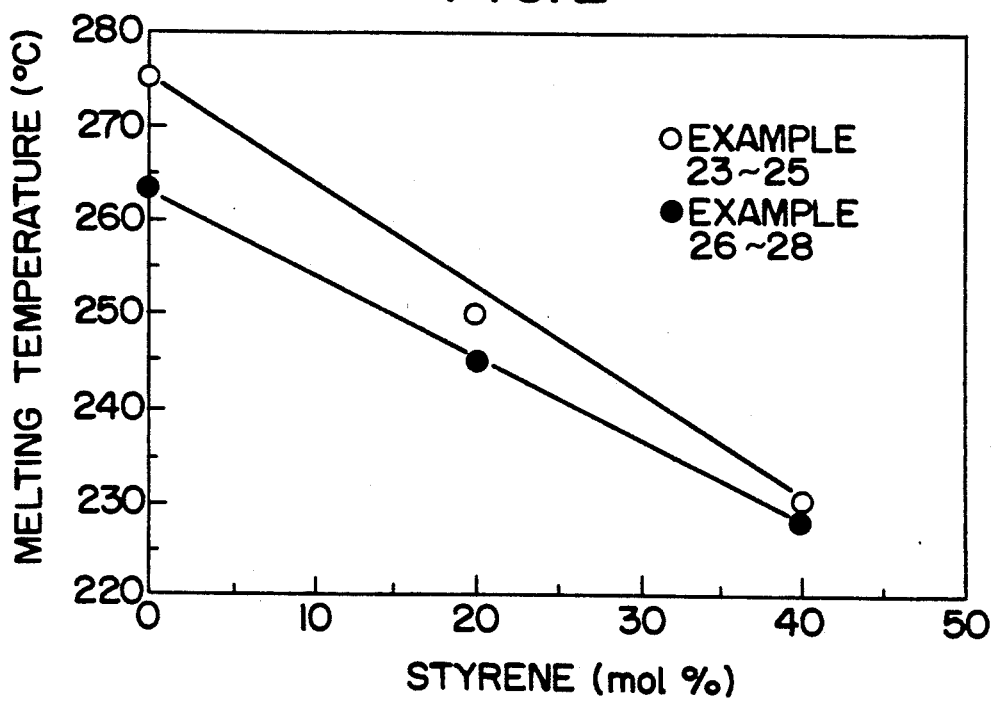
FIG. 2 is a graphical representation of the melting temperature in relation to the amount of styrene in polymers obtained in Examples 23 to 28.

The relation between the melting temperature and the content of styrene in the copolymers of Examples 23 to 25 and Examples 26 to 28 is shown in FIG. 2. The melting temperature at which the viscosity of the copolymers was 5,000 poise by flow tester-CFT-500 (manufactured by Shimazu Seisakusho k.k.) was measured.

TABLE 4

| Example | Feed Compositions (mol %) | | | | | | | Yield (wt %) | Melting Temperature(°C.) |
|---|---|---|---|---|---|---|---|---|---|
| | IN | STY | MA | PMI | AN | MMA | BD | | |
| 23 | 50 | . | 12.5 | 12.5 | 25 | | | 90 | 275 |
| 24 | 30 | 20 | 12.5 | 12.5 | 25 | | | 89 | 250 |
| 25 | 10 | 40 | 12.5 | 12.5 | 25 | | | 91 | 230 |
| 26 | 50 | | | 12.5 | 25 | 12.5 | | 85 | 263 |
| 27 | 30 | 20 | | 12.5 | 25 | 12.5 | | 84 | 245 |
| 28 | 10 | 40 | | 12.5 | 25 | 12.5 | | 88 | 228 |
| 29 | 50 | . | 5 | 10 | 25 | | 10 | 87 | — |
| 30 | 30 | 20 | 5 | 10 | 25 | | 10 | 86 | — |
| 31 | 10 | 40 | 5 | 10 | 25 | | 10 | 90 | — |
| 32 | 30 | | 5 | 20 | 15 | 20 | 10 | 88 | — |
| 33 | 20 | 10 | 5 | 20 | 15 | 20 | 10 | 86 | — |
| 34 | 10 | 20 | 5 | 20 | 15 | 20 | 10 | 85 | — |

Note)
IN: indene
STY: styrene
MA: maleic anhydride
PMI: N-phenylmaleimide
AN: acrylonitrile
MMA: methyl methacrylate
BD: butadiene

EXAMPLE 35

The imidated copolymers of the invention (Examples 24 to 30) were each added to ABS resin (MV grade) available from Sumitomo Norgatack K.K. and shaped into pellets by means of a single-screw extruder at a temperature of 250° C. These samples were subjected to an injection molding machine to make test pieces for measurement of heat deformation temperature (HDT) and also a tensile strength at break. The results of the measurement are shown in Table 5.

TABLE 5

| Imidated Copolymer | Ratio to ABS (wt %) | Heat Deformation Temperature (°C.) | Tensile Strength at Break (Kg/cm²) |
|---|---|---|---|
| nil | | 76 | 210 |
| Example 24 | 5 | 84 | 250 |
| 25 | 10 | 89 | 270 |
| 26 | 10 | 87 | 280 |
| 27 | 10 | 90 | 280 |
| 28 | 10 | 88 | 290 |
| 29 | 10 | 89 | 270 |
| 30 | 10 | 90 | 260 |

EXAMPLE 36

45 wt % of nylon 6, 45 wt % of modified polyphenylene oxide (PPO) resin and 10 wt % of each of the imidated copolymers of the invention (Examples 7, 9 and 14) used as a compatibilizing agent were extruded under the following conditions and injection molded to obtain alloyed resins. The thus obtained alloyed resins were observed through a transmission electron microscope (TEM) with respect to the phase separation. As a result, it was found that the modified PPO was finely dispersed in the nylon resin and thus, the imidated copolymers of the invention were effective as the compatibilizing agent.

| Extrusion conditions: | cylinder temperature | 300° C. |
| --- | --- | --- |
| | revolutions of screw | 200 r.p.m. |
| | polymer feed | 7 kg/hour |
| Injection molding conditions: | cylinder temperature | 280° C. |
| | mold temperature | 80° C. |

EXAMPLES 37, 38 AND COMPARATIVE EXAMPLE 5

ε-caprolactam, hexamethylenediamine and salt of adipic acid were mixed with the amounts shown in table 6, and were melt polymerized in a reaction vessel at 260° C. to obtain nylon 6/66 copolymer.

The thus obtained nylon 6/66 copolymer and the copolymer of Example 14 were mixed with the amounts shown in table 6 and shaped into pellets by means of a extruder at a temperature of 280° C.

The pellets were dried in a reduced atmosphere, and subjected to a injection molding machine with a cylinder temperature of 260° C. and mold temperature of 60° C. to make test pieces for measurement of relative viscosity and Izot impact strength.

In case of the Comparative Example 5, the copolymer of Example 14 was not mixed. Values of resin properties were measured in condition of being absolutery dried.

TABLE 6

| | Explemle 37 | Example 38 | Comparative Example 5 |
| --- | --- | --- | --- |
| Compositions (mol %) | | | |
| Nylon 6/66 | 90 | 95 | 100 |
| (ratio of 6/66) | (85/15) | (20/80) | (20/80) |
| Imidated Copolymer of Example 14 | 10 | 5 | 0 |
| Evaluates | | | |
| Relative Viscosity | 3.4 | 2.5 | 2.5 |
| Izot Impact Strength 23° C. (Kg cm/cm notched) | 80 | 90 | 10 |

EXAMPLES 39 TO 42 AND COMPARATIVE EXAMPLES 6 TO 9

In the same manner as in Example 2 using methyl isobutyl ketone as the solvent for the reaction.

There was obtained imidated copolymers of compositions (in mol%) indicated in Table 7 (Examples 39 and 40, Comparative Examples 6 and 7).

The thus obtained copolymers and polyvinyl chloride resin (Smilit SX-11F) available from Sumitomo Chemical. KK, degree of polymerization 1050, were mixed to obtain the resin compositions which were shown in Table 8 (Examples 41 and 42, Comparative Examples 8 and 9).

These resin compositions were subjected to an hot roll kneading machine with 8 inch diameter rolls of 190° C. surface temperature for 5 minutes to obtain sheet shaped resin compositions.

The sheets were pressed with a plain press machine at 100 kg/cm2 pressure for 10 minutes to make test samples.

These samples were measured with Izot impact strength and softening temperature, and the results are shown in Table 8.

The results in Table 8 show the good improvements in Izot impact strength and softening temperature of the polyvinyl chloride resin composition, since the polyvinyl chloride resin were mixed with the resin improver of this invention.

TABLE 7

| Compositions of Imidated Copolymer (mol %) | IN | STY | MA | MMA | CMI |
| --- | --- | --- | --- | --- | --- |
| Example 39 | 10 | 35 | 9 | 36 | 10 |
| Example 40 | 10 | 44 | 5 | 33 | 10 |
| Comparative Example 6 | — | 45 | 9 | 36 | 10 |
| Comparative Example 7 | — | 54 | 5 | 3 | 8 |

TABLE 8

| | Example 41 | Example 42 | Comparative Example 8 | Comparative Example 9 |
| --- | --- | --- | --- | --- |
| Compositions (wt %) | | | | |
| Polyvinyl chloride | 100 | 100 | 100 | 100 |
| Dioctyl terephthalate | 5 | 5 | 5 | 5 |
| Imidated Copolymer | (Example 39) 30 | (Example 40) 30 | (Comparative Example 6) 30 | (Comparative Example 7) 30 |
| M-101A (stabilizer) | 3 | 3 | 3 | 3 |
| E-101 (stabilizer) | 0.5 | 0.5 | 0.5 | 0.5 |
| Kalen A-88 (lubricant) | 0.4 | 0.4 | 0.4 | 0.4 |
| Evaluates | | | | |
| Appearance | good | good | good | good |
| Izot Impact Strength (kg cm/cm notched) | 3.8 | 3.7 | 3.5 | 3.1 |
| Softening Temperature (°C.) | 102 | 104 | 87 | 91 | note)
M-101A: Dioctyltin dimaleate base stabilizer manufactured by Tokyo Fine Chemical, KK.
E-101: Dioctyltin dilaulate base stabilizer manufactured by Tokyo Fine Chemical, KK.
Kalene A-88: Higher alcohol base lubricant manufactured by Tokyo Fine Chemical, KK.

EXAMPLE 43

The imidated copolymers of the invention (seven Examples in Table 9) were each added to ABS resin (MV grade) available from Sumitomo Norgatack K.K. and shaped into pellets by means of a single-screw extruder at a temperature of 260° C. These samples were subjected to an injection molding machine to make test pieces for measurement of heat deformation temperature (HDT) and also a tensile strength at break. The results of the measurement are shown in Table 9.

TABLE 9

| Imidated Copolymer | Ratio to ABS (wt %) | Heat Deformation Temperature (°C.) | Tensile Strength at Break (Kg/cm$^2$) |
|---|---|---|---|
| nil |  | 76 | 210 |
| Example 3 | 10 | 84 | 280 |
| 8 | 10 | 87 | 260 |
| 9 | 10 | 85 | 270 |
| 10 | 10 | 88 | 260 |
| 12 | 10 | 89 | 270 |
| 18 | 10 | 86 | 260 |
| 22 | 10 | 84 | 240 |

HDT: ASTM D 648

What is claimed is:

1. An imidated copolymer which is obtained by polymerizing a naphtha oil and a maleimide, wherein the naphtha oil contains about 5 to 90 wt % of a polymerizable component and the balance being non-polymerizable components, said polymerizable component of the naphtha oil consisting essentially of the following constituents:
   (A) 60–99 wt % of indene;
   (B) 0.5–29.5 wt % of styrene; and
   (C) 0.5–29.5 wt % in total of at least one compound selected from the group consisting of α-methylstrene, methylstyrene, methylindene, dimethylstyrene, cumarone, and dicyclopentadiene whereby the total amount of indene in the naphtha oil is 3 to 89.1% by weight.

2. The imidated copolymer of claim 1 further comprising at least one component selected from the group consisting of the following (a), (b), (c) and (d):
   (a) styrenes,
   (b) cyanated vinyls,
   (c) acrylic or methacrylic esters, and
   (d) dienes.

3. The imidated copolymer of claim 1 wherein said maleimide is at least one member selected from the group consisting of N-phenylmaleimide and cyclohexylmaleimide.

4. A resin improver for general-purpose plastics including acrylonitrile-butadiene-styrene (ABS) resins, high impact polystyrene (HIPS) resins and polyvinyl chloride (PVC) resins which comprises the imidated copolymer of claim 1 as a primary component.

5. A resin improver for polyamide resins which comprises the imidated copolymer of claim 1 as a primary component.

6. A compatibilizing agent for polyamide-based resin alloys including polyamide-polycarbonate (PC) resins and polyamide-modified polyphenylene oxide (PPO) resins which comprises the imidated copolymer of claim 1 as a primary component.

7. An imidated copolymer which is obtained by polymerizing naphtha oil, a maleimide and a maleic anhydride, wherein the naphtha oil contains about 5 to 90 wt % of a polymerizable component and the balance being non-polymerizable components, said polymerizable component of the naphtha oil consisting essentially of the following constituents:
   (A) 60–99 wt % of indene;
   (B) 0.5–29.5 wt % of styrene; and
   (C) 0.5–29.5 wt % in total of one or more compounds selected from the group consisting of α-methylstyrene, methylstyrene, methylindene, dimethylstyrene, trimethylstyrene, cumarone, and dicyclopentadiene whereby the total amount of indene in the naphtha oil is 3 to 89.1% by weight.

8. The imidated copolymer according to claim 7 further comprising at least one component selected from the group consisting of the following (a), (b), (c) and (d):
   (a) styrenes,
   (b) cyanated vinyls,
   (c) acrylic or methacrylic esters, and
   (d) dienes.

9. An imidated copolymer according to claim 7 wherein said maleimide is at least one member selected from the group consisting of N-phenylmaleimide and cyclohexylmaleimide.

10. A resin improver for general-purpose plastics including acrylonitrile-butandiene-styrene (ABS) resins, high impact polystyrene (HIPS) resins and polyvinyl chloride (PVC) resins which comprises the imidated copolymer of claim 7 as a primary component.

11. A resin improver for polyamide resins which comprises the imidated copolymer of claim 7 as a primary component.

12. A compatibilizing agent for polyamide-based resin alloys including polyamide-polycarbonate (PC) resins and polyamide-modified polyphenylene oxide (PPO) resins which comprises the imidated copolymer of claim 7 as a primary component.

13. An imidated copolymer comprising indene, a monomaleimide and maleic anhydride, wherein the sum of the contents of the maleimide and the maleic anhydride is in the range of from 25 to 75 mol % based on the total moles of the imidated copolymer and the mole ratio of maleic anhydride to maleimide is 1:99 to 95:5.

14. The imidated copolymer according to claim 13 further comprising at least one component selected from the group consisting of compound of the following (a), (b), (c) and (d):
   (a) styrenes,
   (b) cyanated vinyls,
   (c) acrylic or methacrylic esters, and
   (d) dienes.

15. An imidated copolymer according to claim 13 wherein said maleimide is at least one member selected from the group consisting of N-phenylmaleimide and cyclohexylmaleimide.

16. A resin improver for general-purpose plastics including acrylonitrile-butandiene-styrene (ABS) resins, high impact polystyrene (HIPS) resins and polyvinyl chloride (PVC) resins which comprises the imidated copolymer of claim 13 as a primary component.

17. A resin improver for polyamide resins which comprises the imidated copolymer of claim 13 as a primary component.

18. A compatibilizing agent for polyamide-based resin alloys including polyamide-polycarbonate (PC) resins and polyamide-modified polyphenylene oxide (PPO) resins which comprises the imidated copolymer of claim 13 as a primary component.

* * * * *

UNITED STATES PATENT AND TRADEMARK OFFICE
CERTIFICATE OF CORRECTION

PATENT NO. : 5,218,069

DATED : June 8, 1993

INVENTOR(S) : ENOMOTO et al

It is certified that error appears in the above-identified patent and that said Letters Patent is hereby corrected as shown below:

Column 16,
    Claim 13, line 38, change "monomaleimide" to

--maleimide--

Signed and Sealed this

Twenty-sixth Day of July, 1994

Attest:

BRUCE LEHMAN

*Attesting Officer*     *Commissioner of Patents and Trademarks*